United States Patent Office 2,920,964
Patented Jan. 12, 1960

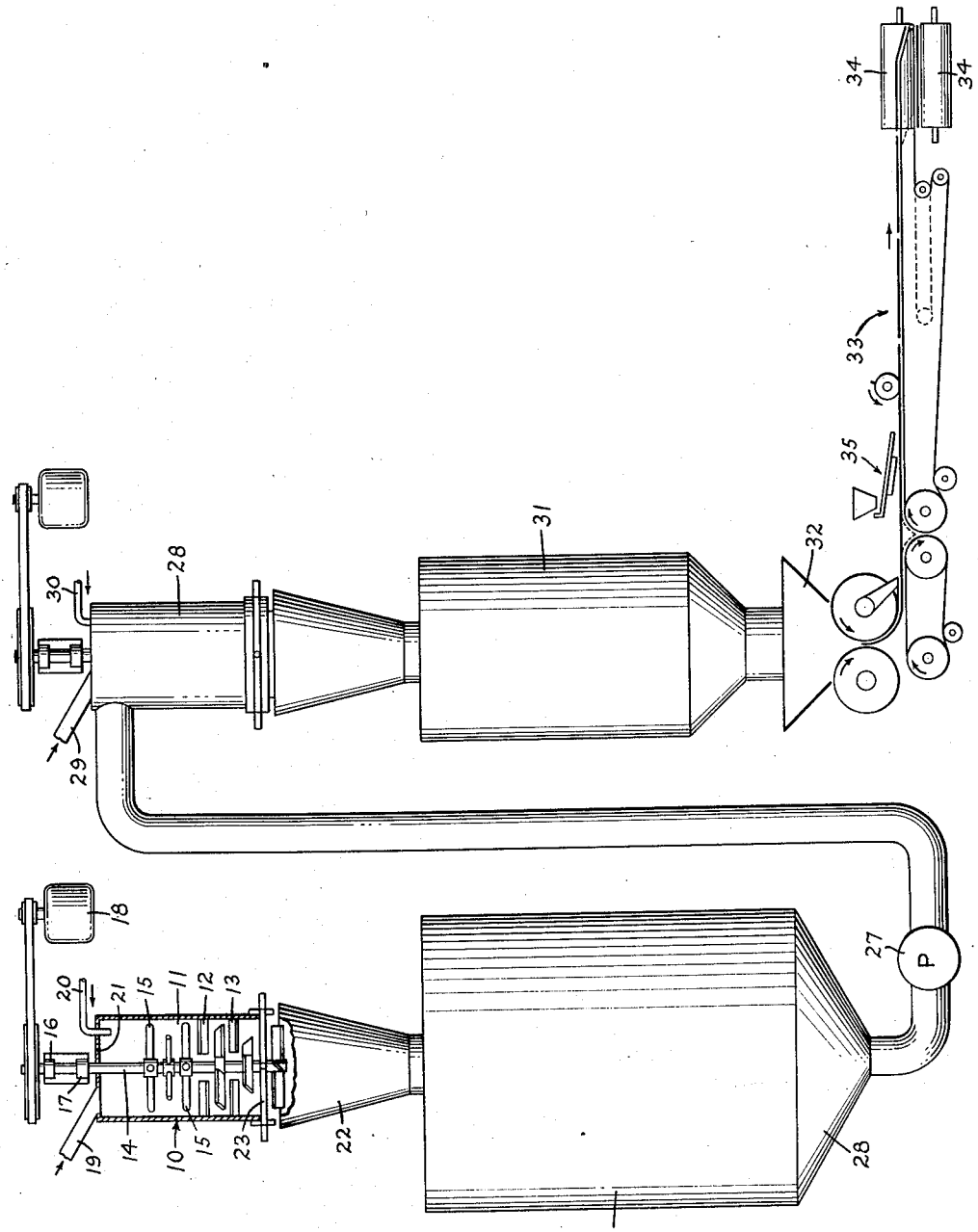

2,920,964

METHOD OF PRODUCING SODA CRACKERS AND OTHER FERMENTED PRODUCTS

Earle T. Oakes, East Islip, N.Y., assignor to The E. T. Oakes Corporation, Islip, N.Y., a corporation of New York Application October 16, 1956, Serial No. 616,282

5 Claims. (Cl. 99—90)

This invention relates to methods of and apparatus for continuously producing doughs of the type which require a prolonged period of standing for fermentation or the like, and it relates particularly to methods and apparatus for continuously manufacturing acid doughs, graham cracker doughs, chocolate doughs, doughs for soda crackers and the like.

Soda crackers are made by a conventional method used by practically every baker in the baking industry. In accordance with this method, a dough trough about 7 feet long by 30 inches deep and about 40 inches wide at the top and mounted on casters is charged with 600 pounds of flour and approximately the following amounts of other ingredients; 40 gallons of water, one pound of yeast, 10 pounds of salt, 100 pounds of shortening and in some instances a small amount of dry milk powder. The trough is wheeled under the spindles of a large commercial mixing device where the ingredients of the dough or sponge are mixed for about three minutes. The trough is then transferred to a proof room having a carefully controlled temperature and humidity where the dough is allowed to ferment for about 19 hours. At the end of this time, the trough is brought back to the mixing room where 400 pounds of flour are added to and mixed with the remainder of the dough for a period of about three minutes. The trough is then returned to the proof room where it is proofed for another five hours. At the end of this time, the dough is removed from the trough and is sheeted, cut into crackers and finally baked.

An ordinary baking oven operating 24 hours a day will require at least 60 troughs of dough per day so that the labor costs for mixing and handling the dough run into very large amounts. Moreover, expensive equipment including humidifying and temperature controls is required to enable the production of a suitable product.

The manufacture of soda crackers is further made complicated by certain factors that are difficult to control in accordance with the above-described method. During the fermentation of the sponge, acid is formed by the action of certain acid-forming organisms which are present in the flour. The amount of such organisms is variable as is the amount of acid formed during fermentation. The acid produced in the dough must be neutralized by the addition of soda and the quality of the resulting product may, in a large degree, depend upon the amount of soda added. Inasmuch as the formation of acid is dependent upon the amount of acid forming organisms present and this is an uncontrolled factor, it is difficult to determine precisely the amount of soda that should be added to exactly neutralize the acid. This is particularly so for the reason that the soda is added at the time of mixing of additional flour with the sponge and the operator must estimate the amount of soda that should be added to neutralize the acid already formed during the initial fermentation period and the acid which will be formed during the final proofing period. Under these conditions, it is not unusual for so much excess soda or acid to be present that the crackers are discolored and have an undesirable flavor.

Despite the fact that the prior methods are expensive, time consuming, and do not produce an altogether satisfactory product, no one heretofore has provided a method or apparatus which would overcome the defects of such methods.

In accordance with the present invention, I have provided a method and system for substantially continuously making cracker doughs and other doughs that require prolonged standing for fermentation or other reasons thereby doing away with a very substantial proportion of the apparatus heretofore required and obtaining other economies resulting from such continuous operation.

More particularly, in accordance with the present invention, I provide a system including a continuous dough mixer in combination with a large storage receptacle having a capacity of several hours output of the continuous mixer into which the dough can be discharged continuously at one zone and removed continuously at another place or zone for transfer to a sheeter, dough divider or the like, as may be desired. The dough remains substantially quiescent in the storage receptacle for a sufficient period of time to enable the necessary fermentation to take place so that the dough is in condition for such further treatments as balling, sheeting, laminating or the like, which precede the baking operation.

The dough can be directly formed in a continuous mixer by mixing flour, water, shortening and other ingredients and passing it directly to a storage and proofing receptacle. When a sponge process is used, the sponge including flour, water, yeast, shortening and other desired ingredients may also be mixed by means of a continuous mixer and the sponge is discharged into a suitable proofing tank. After period of sponge fermentation, this sponge may be mixed with additional ingredients in the continuous mixer and delivered to the dough fermentation tank. In order to facilitate the handling of the sponge, it may be mixed with a smaller than normal proportion of flour so that the sponge is somewhat more fluid than the usual sponge enabling it to be pumped from the fermentation tank to the continuous dough mixer.

Furthermore, dough can be prepared with a so-called liquid ferment or brew. The liquid ferment is prepared as a batch in a suitable water jacketed fermentation tank equipped with agitators. After sufficient fermentation, this liquid ferment usually consisting of flour, yeast, water and salt and so forth sufficient for a twenty-four hour run of the baked product is continuously mixed with the remaining materials required for the dough and proofed as described above.

Also, in accordance with the present invention I have devised a method and apparatus enabling the acid present in the cracker dough to be neutralized after the dough fermentation is completed and to be accurately regulated on the basis of the amount of acid present in the dough at the time it is supplied to the sheeting and laminating apparatus.

Inasmuch as the mixing and fermentation operations are conducted continuously and in large proofing tanks, it will be understood that dough troughs and separate proof rooms are not required and that the humidity and temperature control of the operation may be primarily restricted to the proofing tanks.

For a better understanding of the present invention, reference may be had to the accompanying drawing in which the single figure is a schematic illustration of a typical system embodying the present invention.

For purpose of illustration a system is described herein which may be used for the production of various kinds of doughs that require a period of standing for fermentation or other reasons, and including all of the elements necessary for this operation and also for the manufacture of soda crackers in which a sponge is used. To that end, the apparatus may include a continuous mixer 10 of the type disclosed more particularly in my copending application Serial No. 616,281, filed October 16, 1956 and now abandoned which includes a main mixing chamber 11 provided with a series of radially, inwardly projecting stationary blades 12 and 13 of generally rectangular cross section and which are pitched in opposite directions. Cooperating with the fixed blades is a central rotor shaft 14 having radially extending rod-like mixing elements 15 thereon, the shaft being rotatably mounted in bearings 16 and 17 at the top of the chamber and driven by means of an electric motor 18 or the like. The various ingredients to be used in the preparation of a sponge dough or sponge may be introduced by means of a chute 19 and a supply pipe 20 which extend through the closed top 21 of the mixer. The lower end of the mixer is provided with a discharge cone 22 and a perforated bottom plate 23 through which the sponge can flow principally by gravity as it is mixed. As the sponge is formed, it is discharged into a large proofing tank 25 which is provided with a generally conical bottom 26 and a discharge pipe communicating with a pump 27. The capacity of the proofing tank 25 is large enough to require the continuous operation of the mixer 10 for a period of hours to fill it. Thus for an 8 hour run, the tank should have a capacity for the output for 8 hours of operation, and for around-the-clock operation, the tank should have capacity for 19 hours of operation if the fermentation time is 19 hours. In a typical device for 8 hours' operation, the capacity of the tank 25 is between about 30,000 and 35,000 pounds of sponge. When the proofing time has been satisfied, the pump can be set into operation to deliver the sponge to another continuous mixer 28 like the mixer 10 and at such a rate as will make up into dough as fast as the oven will require it. Inasmuch as the sponge moves from top to bottom of the tank, it is proofed for the required 19 hours before it is delivered to the mixer 28 where additional flour and such other ingredients as may be desired are added through the chute 29 and the pipe 30. The continuous mixer 28 discharges into a smaller tank 31 which may suitably have a capacity of about 5 hours operation of the mixers 10 and 28, so that the dough discharged from the mixer 28 is subjected to a further standing of 5 hours in its movement from the top to the bottom of the tank 31. This tank may have a capacity of about 2000 to 4000 pounds of dough. The dough from the tank 31 may then be fed to any suitable further processing apparatus such as, for example, a dough sheeter 32 of the type disclosed in my Patent No. 2,687,699, dated August 31, 1954, to make a thin sheet of dough may then be passed to the cutting and laminating apparatus 33 which is also disclosed in Patent No. 2,687,699, where it is formed into a laminated sheet, then reduced further to a thin cracker dough sheet by sheeting rolls 34 before being cut and fed into the baking oven (not shown). In case the liquid ferment process is used, the details described above are suitably modified as regards type and size of sponge tank.

A feature of the sheeting and laminating device which has great utility in the practice of my method of making soda crackers is the provision of a sifter 35 for flouring the sheet at a point overlying the conveyor leading to the laminating device. I have discovered that by adding soda to the flour in the sifter 35 it is possible to neutralize the acid produced by fermentation in the tanks 25 and 31. The sheet issuing from the sheeter 32 is about 0.125 inch thick or less so that when a sheet is dusted on one surface with soda admixed with flour, the soda does not have to penetrate very deeply into the sheet in order to react with all of the acid therein. When the sheets are laminated they contain about eight layers so that when the laminated sheet is further reduced in cross section to about .025 inch to form the cracker sheet, the laminations will be reduced to about .003 inch in thickness so that the soda deposited on the surface of each lamination will be uniformly distributed throughout the entire sheet and thereby capable of reacting with the acid throughout the dough. The amount of soda added by dusting on the sheet can be regulated by testing the acidity of the dough as it leaves the final proofing receptacle 31. In this way an accurate continuous check can be obtained on the acidity of the dough and a much more accurate control obtained than is possible when the soda is added at the dough mixer 28.

While it is more convenient to use soda in dry form in the sifter, it will be understood that a spray pipe or head may be used to spray a soda solution on the sheet, if desired.

It will be understood that other types of dough can be made without the prior preparation of a sponge and that the preliminary sponge preparation and fermentation can be omitted and dough can be mixed in the continuous mixer 28 and passed directly to the proofing tank 31 where it may ferment or stand for a period of 5 hours or so depending upon the capacity of the tank or the requirements of the product.

In the preparation of a typical cracker dough, ingredients can be combined in the usual way by mixing the ingredients in the proportions of 600 pounds of flour, 40 gallons of water, 1¼ pounds of yeast and shortening in an amount between about 100 and 125 pounds. The ingredients are introduced in the mixer 10 continuously and at controlled rates and the sponge is discharged continuously into the proofing tank 25. When the sponge is discharged to the mixer 28, additional flour is introduced in controlled proportion to the sponge so that 400 pounds of flour are added to the sponge made from each 600 pounds of flour introduced into the mixer 10. Flour is added through the chute 29 to the sponge entering the continuous mixer 28 to produce the dough. I have found that it is more convenient in some instances to prepare the sponge by using flour in the proportion of 100 pounds to 40 gallons of water, 1¼ pounds of yeast and with or without shortening to produce a more fluid mixture. Sufficient flour is present to enable the acid-forming organisms to produce the acid necessary to enable the yeast to produce carbon dioxide for leavening the dough and for the proteolytic enzymes present to condition the gluten of the flour. The fermented sponge is discharged continuously from the tank 25 and flour and such other ingredients as have not previously been added in the mixer 28 are mixed with the sponge to form the dough. The proportion of flour added in the mixer is about 9 times the amount of flour used in the preparation of the sponge i.e., 900 pounds/100 pounds. The dough then is allowed to ferment in the tank 31 and the acid may be neutralized as described above.

The process may also involve use of so-called liquid ferments or brews which are prepared by fermenting a fluid mixture of flour, yeast, water and salt. The fermented composition is mixed with additional flour in the mixer 28 and is allowed to proof in the tank 31. It is convenient to include two tanks for preparation of the liquid ferment so that one batch can be fermented while the other batch is being added to flour to prepare dough.

Inasmuch as the yeast fermentation period in which sugar is converted to carbon dioxide and alcohol produces a loss amounting to an appreciable percentage of all of the material used, it is desirable to keep such fermentation loss as low as possible. It is for this reason that a fermentation period of 5 hours in the tank 31 is generally found to be sufficient for the production of cracker doughs.

It will be understood that a temperature control is desirable for the proofing tanks 25 and 31 and this can be readily accomplished by providing jackets for these tanks or by putting them in enclosures of appropriate size. Generally it is desirable to jacket the tanks. The enclosures may be controlled for temperature and humidity.

In the preceding description, it will be apparent that a method and apparatus have been provided by means of which crackers and other dough products can be made continuously without a sacrifice of the necessary fermentation time to produce palatable and saleable products, but without the need of the large storage rooms and large number of troughs and other equipment which heretofore rendered the batch or discontinuous methods inefficient and costly. Moreover, most of the labor involved in the preparation of the dough is eliminated with substantial savings in labor costs.

The capacity of the mixers and the proofing and fermentation tanks are related to the capacity of the oven installation so that an adequate supply of dough can be furnished to satisfy the operation of the oven. Thus, large capacity ovens require larger mixing, proofing and fermentation apparatus than ovens of smaller capacity.

During the operation of the system, the mixers 10 and 28 will be set into operation prior to beginning the baking operation and will be stopped before the conclusion of the baking operation. Thus, if hopper 31 contains a five hour supply, the mixer 28 will be started 5 hours before the baking operation starts and its operation will be discontinued 5 hours before the baking operation is discontinued so that the fermentation receptacle 31 is emptied at the conclusion of the baking operation.

It will be understood that the arrangement of the mixers and the tanks may be conformed to the building in which the installation is made and that by using several floors of a building, it is possible to install the mixer 10 and proofing receptacle 25 above the mixer 28 to enable gravity feed. In single-story installations, a system may be used in which the sponge may be pumped, as described, from the bottom of the receptacle 25 to the upper end of the mixer 28. The mixer 10 and the receptacle 25 even can be installed on a lower lever than the mixer 28 and the fermentation receptacle 31.

Accordingly, it will be understood that the system disclosed herein is illustrative and should not be considered as limiting the scope of the following claims.

I claim:

1. A method of preparing cracker dough sheets prepared for baking comprising continuously mixing flour, water and yeast to form a cracker dough, discharging the dough, as formed, into a fermentation chamber to provide a supply of dough therein, maintaining the dough substantially quiescent in said fermentation chamber for a sufficient time to proof the dough, continuously withdrawing dough from said chamber, forming the dough into a thin sheet having a plurality of laminations to be delivered to an oven for baking, the chamber having a capacity sufficiently great to allow the dough therein to ferment to a degree required in cracker doughs, and applying soda to said laminations to substantially neutralize said dough.

2. A method of preparing cracker dough sheets prepared for baking comprising continuously mixing flour, water and yeast to form a cracker dough, discharging the dough, as formed, into a fermentation chamber to provide a supply of dough therein, maintaining the dough substantially quiescent in said fermentation chamber for a sufficient time to proof the dough, continuously withdrawing dough from said chamber, forming the dough into a thin sheet having a plurality of laminations to be delivered to an oven for baking, the chamber having a capacity sufficiently great to allow the dough therein to ferment to a degree required in cracker doughs, and dusting said laminations with flour containing soda to substantially neutralize said dough.

3. A method of preparing sheets of dough comprising continuously supplying flour, water and yeast to a mixing zone, mixing said flour, water and yeast to form a dough, continuously discharging the dough from the mixing zone into a fermentation zone having a capacity to enable said dough to ferment therein a substantial period of time, maintaining said dough substantially quiescent in said zone for fermentation therein to produce an acid dough, continuously withdrawing said acid dough from said zone at about the same rate that the dough is supplied from said mixing zone, forming the dough withdrawn from said fermentation zone into thin sheets having a plurality of laminations of dough therein, and applying soda to said laminations to substantially neutralize the acid in said fermented dough.

4. The method of preparing sheets of dough preparatory to baking the same comprising continuously mixing a fermentable dough containing flour, water, yeast and acid forming agents, continuously supplying fermentable dough to a fermenting zone for fermentation therein to provide an acid dough, maintaining the dough in said zones substantially quiescent, continuously withdrawing said acid dough from said fermentation zone at a place remote from the place where the fermentable dough is supplied to said zone, said fermentable dough being supplied and said acid dough being withdrawn at approximately the same rate to maintain a substantially constant amount of dough in said fermentation zone for a period of time sufficient for the desired fermentation to take place, forming the acid dough into a sheet containing a plurality of thin layers of said dough and neutralizing the acid in said dough by applying soda to the thin layers forming said sheet.

5. The method of neutralizing the acid in acid cracker doughs comprising forming the acid dough into a thin sheet of said dough, applying soda to said sheet to substantially neutralize the acid in said dough and assembling a plurality of layers of said sheet in superimposed relation to form a thicker laminated sheet.

References Cited in the file of this patent

UNITED STATES PATENTS

| | | |
|---|---|---|
| 1,790,347 | Hawkins | Jan. 27, 1931 |
| 2,028,470 | Nordby | Jan. 21, 1936 |
| 2,173,000 | Holtzman | Sept. 12, 1939 |
| 2,255,282 | Duffy et. al. | Sept. 9, 1941 |
| 2,288,118 | Vaupel | June 30, 1942 |
| 2,687,699 | Oakes | Aug. 31, 1954 |

FOREIGN PATENTS

| | | |
|---|---|---|
| 4,845 | Great Britain | of 1878 |
| 569,453 | Great Britain | May 28, 1945 |
| 735,184 | Great Britain | Aug. 17, 1955 |